United States Patent [19]
Wrzesinski

[11] Patent Number: 5,023,493
[45] Date of Patent: Jun. 11, 1991

[54] FET AND BIPOLAR TRANSISTOR BRIDGE CIRCUIT FOR DRIVING A LOAD

[75] Inventor: Stanley Wrzesinski, Arlington Heights, Ill.

[73] Assignee: Motorola, Inc., Schaumburg, Ill.

[21] Appl. No.: 417,094

[22] Filed: Oct. 4, 1989

[51] Int. Cl.$^5$ ............... H03K 17/60; H03K 17/74; H03K 3/01; B60L 1/00
[52] U.S. Cl. .................... 307/570; 307/257; 307/270; 307/10.1; 318/293
[58] Field of Search ............... 307/570, 571, 257, 270, 307/10.1, 314; 318/293

[56] References Cited
U.S. PATENT DOCUMENTS 4,112,428  9/1978  Dorsman ........................ 307/257
4,683,387  7/1987  Jones et al. .................... 307/571

Primary Examiner—Stanley D. Miller
Assistant Examiner—Trong Phan
Attorney, Agent, or Firm—Peter Hudson

[57] ABSTRACT

A bridge circuit (2) for driving a load such as an electric motor (36) in one direction or an opposite direction as desired, the circuit comprising first (4) and second (24) parallel arms for connection across an automobile battery supply voltage, each arm comprising an FET switch (6, 26) and a bipolar PNP transistor (8, 28) connected in series via mid-point nodes for connection across the load. In each arm the intrinsic diode of the field effect transistor and the base-emitter junction diode of the PNP transistor are arranged to conduct forward-biased current in opposite directions. In this way, no current path is provided through the arms of the bridge circuit in the event that the voltage supply to the circuit is reversed.

7 Claims, 1 Drawing Sheet

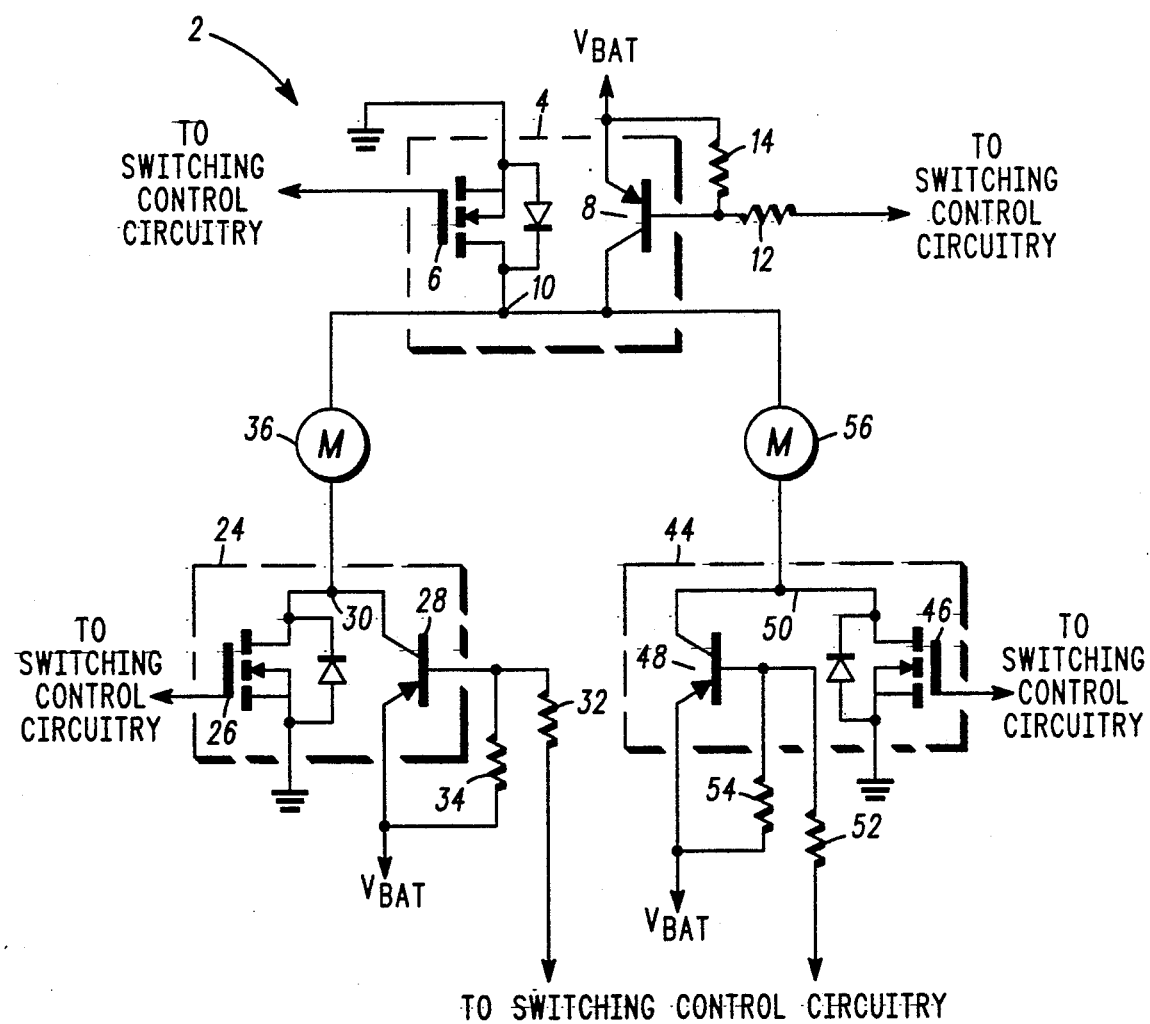

FET AND BIPOLAR TRANSISTOR BRIDGE CIRCUIT FOR DRIVING A LOAD

BACKGROUND OF THE INVENTION

This invention relates to bridge circuits for driving loads. Such bridge circuits find application in, for example, driving loads such as electric motors, which must be driven in opposite directions as desired.

In a typical known bridge circuit for driving an electric motor in an automotive application, the bridge circuit is formed by four field effect transistors connected in series pairs as the two parallel arms of the bridge. The voltage supply provided by the automobile battery is connected across the end-points of the two arms, and the mid-points of the two arms are connected across the electric motor. By switching the field effect transistors at two opposite sides of the bridge "on" and switching the other field effect transistors "off", current is driven through the motor in one direction; by switching the four field effect transistors to their opposite states, current is driven through the motor in an opposite direction.

However, such a known bridge circuit will be damaged if the battery voltage is connected to the bridge circuit with reverse polarity. The field effect transistors of the bridge are arranged so that the intrinsic diodes between their source and drain electrodes are reverse biased and no current flows when the battery voltage is connected to the bridge with the predetermined correct polarity. If the battery voltage is connected with the opposite polarity (as can easily occur in an automobile), the intrinsic diodes of the field effect transistors become forward biased and conduct: the transistors quickly burn out. Therefore, such known bridge circuits, if they are to be used in automotive applications, must be provided with additional reverse battery protection.

SUMMARY OF THE INVENTION

It is an object of the present invention to provide an improved bridge circuit for driving a load wherein the above disadvantage may be overcome or at least alleviated.

In a preferred form of the present invention a bridge circuit for driving a load comprises two parallel arms for connection at their end-points across an automobile battery supply voltage. The two arms each comprise a series-connected field effect transistor switch and a PNP bipolar transistor switch. The mid-points of the two arms are for connection across an electric motor. In each arm the intrinsic diode of the field effect transistor and the base emitter diode junction of the PNP transistor are arranged to conduct forward biased current in opposite directions so as to prevent conduction through the arm if the intrinsic diode of the field effect transistor is forward-biased.

Thus, it will be appreciated, no current path is provided through the arms of the bridge circuit in the event that the voltage supply to the circuit is reversed because, if a field effect transistor switch means in an arm has its intrinsic diode forward biased, the bipolar transistor switch in the same arm has its base-emitter diode junction reverse biased.

BRIEF DESCRIPTION OF THE DRAWINGS

One bridge circuit for driving a load in accordance with the present invention will now be described, by way of example only, with reference to the accompanying drawings, in which:

FIG. 1 shows a circuit diagram of a bridge circuit for driving two electric motors from an automobile battery voltage supply.

DESCRIPTION OF THE PREFERRED EMBODIMENT

Referring now to FIG. 1, a bridge circuit 2 has a first arm 4 constituted by an N-channel field effect transistor (FET) switch 6 and a bipolar PNP transistor switch 8. The FET 6 has its source electrode connected to the negative, or earth, terminal of an automobile battery (not shown), and has its drain electrode connected to a node 10. The FET 6 has its gate electrode connected to switching control circuitry (not shown). The bipolar PNP transistor 8 has its emitter connected to a voltage $V_{BAT}$ supplied from the positive terminal of the automobile battery (typically +12 V), and has its collector connected to the node 10. The bipolar PNP transistor 8 has its base connected the switching control circuitry via a resistor 12 (having a value of approximately 100Ω). The emitter of the bipolar transistor 8 is connected to its base via a resistor 14 (having a value of approximately 1 KΩ) to aid the switching of the transistor.

The bridge circuit 2 also has a second arm 24 constituted by an N-channel FET switch 26 and a bipolar PNP transistor switch 28. The FET 26 has its source electrode connected to the negative terminal of the automobile battery, and has its drain electrode connected to a node 30. The FET 26 has its gate electrode connected to the switching control circuitry. The bipolar PNP transistor 28 has its emitter connected to the battery voltage $V_{BAT}$, and has its collector connected to the node 30. The bipolar PNP transistor 28 has its base connected the switching control circuitry via a resistor 32 (having a value of approximately 100Ω). The emitter of the bipolar transistor 28 is connected to its base via a resistor 34 (having a value of approximately 1 KΩ) to aid the switching of the transistor.

A first electric motor 36 has its winding connected between the node 10 of the first arm 4 and the node 30 of the second arm 24.

The bridge circuit 2 also has a third arm 44 constituted by a FET switch 46 and a bipolar PNP transistor switch 48. The FET 46 has its source electrode connected to the negative terminal of the automobile battery, and has its drain electrode connected to a node 50. The FET 46 has its gate electrode connected to the switching control circuitry. The bipolar PNP transistor 48 has its emitter connected to the battery voltage $V_{BAT}$, and has its collector connected to the node 50. The bipolar PNP transistor 48 has its base connected the switching control circuitry via a resistor 52 (having a value of approximately 100Ω). The emitter of the bipolar transistor 48 is connected to its base via a resistor 54 (having a value of approximately 1 KΩ) to aid the switching of the transistor.

A second electric motor 56 has its winding connected between the node 10 of the first arm 4 and the node 50 of the second arm 44.

The bipolar PNP transistors 8, 28 and 48 are all of type TIP36A, sold by Motorola, Inc. The FETs 6, 26 and 46 are all of type MTP40NO6L, also sold by Motorola, Inc. As is well known, the FETs 6, 26 and 46 each have an intrinsic diode (not shown) which can be considered as being in parallel with the FET's current electrodes, with its anode connected to the drain electrode and its cathode connected with the source electrode.

In use of the bridge circuit 2, the switching control circuitry (which is identical to that used in the prior art) supplies the necessary control signals to simultaneously switch on the relevant transistors to drive the motors 36 and 56 in the desired directions. The circuit and operation of the switching control circuitry is the same as used in the prior art and need not be considered in greater detail herein.

To drive the first motor 36 in one direction, the PNP transistor 28 and the FET 6 are switched "off", while the PNP transistor 8 and the FET 26 are switched "on"; this causes current to flow through the PNP transistor 8, through the motor 36 (downwards as seen in FIG. 1), and through the FET 26. Alternatively, to drive the first motor 36 in the opposite direction, the PNP transistor 8 and the FET 26 are switched "off", while the PNP transistor 28 and the FET 6 are switched "on"; this causes current to flow through the PNP transistor 28, through the motor 36 (upwards as seen in FIG. 1), and through the FET 6.

Similarly, to drive the second motor 56 in one direction, the PNP transistor 48 and the FET 6 are switched "off", while the PNP transistor 8 and the FET 46 are switched "on"; this causes current to flow through the PNP transistor 8, through the motor 56 (downwards as seen in FIG. 1), and through the FET 46. Alternatively, to drive the first motor 56 in the opposite direction, the PNP transistor 8 and the FET 46 are switched "off", while the PNP transistor 48 and the FET 6 are switched "on"; this causes current to flow through the PNP transistor 48, through the motor 56 (upwards as seen in FIG. 1), and through the FET 6.

When neither motor 36 nor motor 56 is energized, the switching control circuitry switches all the transistors "off". In this condition, with the battery earth voltage applied to the sources of the FETs 6, 26 and 46, and with positive battery voltage $V_{BAT}$ applied to the emitters of the PNP transistors 8, 28 and 48, no current flows in any of the three arms 4, 24 or 44 because in each arm the intrinsic diode of the FET is reverse biased, preventing current flow.

In the event that the automobile battery is improperly connected so that the battery earth voltage applied to the emitters of the PNP transistors 8, 28 and 48, and the positive battery voltage $V_{BAT}$ is applied to the sources of the FETs 6, 26 and 46, still no current flows in any of the three arms 4, 24 or 44 because in each arm although the intrinsic diode of the FET is now forward biased, the base-emitter junction of the PNP transistor is reverse biased, preventing current flow. In this way, the PNP transistors 8, 28 and 48, being of type TIP36A, have base-emitter junctions with reverse breakdown voltages in excess of 12 V, and so provide adequate protection against reverse polarity connection, as required in an automotive application.

It will be appreciated that although in the circuit of FIG. 1 in the above described embodiment bipolar PNP transistors are used, other types of transistors whose intrinsic diodes are arranged opposite to those of the relevant FET in the same arm of the bridge may alternatively be used, e.g. NPN transistors.

It will be appreciated that various modifications or alternatives to the above described embodiment will be apparent to the man skilled in the art without departing from the inventive concept.

I claim:

1. A bridge circuit for driving a load, the circuit comprising:
   a first arm for connection between a first supply potential and a second supply potential, the first arm comprising first and second switch means connected in series via a first node for connection to a first terminal of a load; and
   a second arm for connection between the first supply potential and the second supply potential, the second arm comprising third and fourth switch means connected in series via a second node for connection to a second terminal of the load,
   the first switch means and the third switch means each being field effect transistors having intrinsic diodes conducting forward-biased current in predetermined directions, and
   the second switch means and the fourth switch means each being bipolar transistors having diode junctions conducting forward-biased current in directions opposite respectively to the intrinsic diodes of the first switch means and the third switch means, so as to prevent conduction through the first or second arm if the intrinsic diode of the first switch means or the third switch means is forward-biased.

2. A bridge circuit according to claim 1 wherein the field effect transistors and N-channel field effect transistors.

3. A bridge circuit according to claim 1 wherein the bipolar transistors are PNP transistors.

4. A bridge circuit according to claim 1 wherein the diode junctions of the bipolar transistors are the bipolar transistors' base-emitter junctions.

5. A bridge circuit according to claim 1 for additionally driving a further load, the circuit further comprising a third arm for connection between the first supply potential and the second supply potential, the third arm comprising fifth and sixth switch means connected in series via a third node, the first and third nodes being arranged for connection across the further load.

6. A bridge circuit according to claim 1 for use with an automobile battery voltage supply wherein the bipolar transistors' junctions have reverse breakdown voltages greater than substantially twelve volts.

7. A bridge circuit for driving a load, the circuit comprising:
   a first arm for connection between a first supply potential and a second supply potential, the first arm comprising first and second switch means connected in series via a first node for connection to a first terminal of a load; and
   a second arm for connection between the first supply potential and the second supply potential, the second arm comprising third and fourth switch means connected in series via a second node for connection to a second terminal of the load,
   the first switch means and the third switch means each being N-channel field effect transistors having intrinsic diodes conducting forward-biased current in predetermined directions, and
   the second switch means and the fourth switch means each being bipolar PNP transistors having base-emitter junction diodes conducting forward-biased current in directions opposite respectively to the intrinsic diodes of the first switch means and the third switch means, so as to prevent conduction through the first and second arm if the intrinsic diode of the first switch means or the third switch means is forward-biased.

* * * * *

UNITED STATES PATENT AND TRADEMARK OFFICE
CERTIFICATE OF CORRECTION

PATENT NO. : 5,023,493

DATED : June 11, 1991

INVENTOR(S) : Stanley Wrzesinski

It is certified that error appears in the above-identified patent and that said Letters Patent is hereby corrected as shown below:

```
Column 4, line 42, "transistors' junctions" should be
--transistors' diode junctions--.
```

Signed and Sealed this

Thirtieth Day of March, 1993

*Attest:*

STEPHEN G. KUNIN

*Attesting Officer*  *Acting Commissioner of Patents and Trademarks*